May 5, 1970  R. L. SPEAKER ET AL  3,510,014
CONVEYOR SYSTEM

Filed Oct. 2, 1967  3 Sheets-Sheet 1

INVENTORS
RICHARD L. SPEAKER
TED J. HARENDA
ARTHUR L. THOMAS
BY
Andrus & Starke
Attorneys

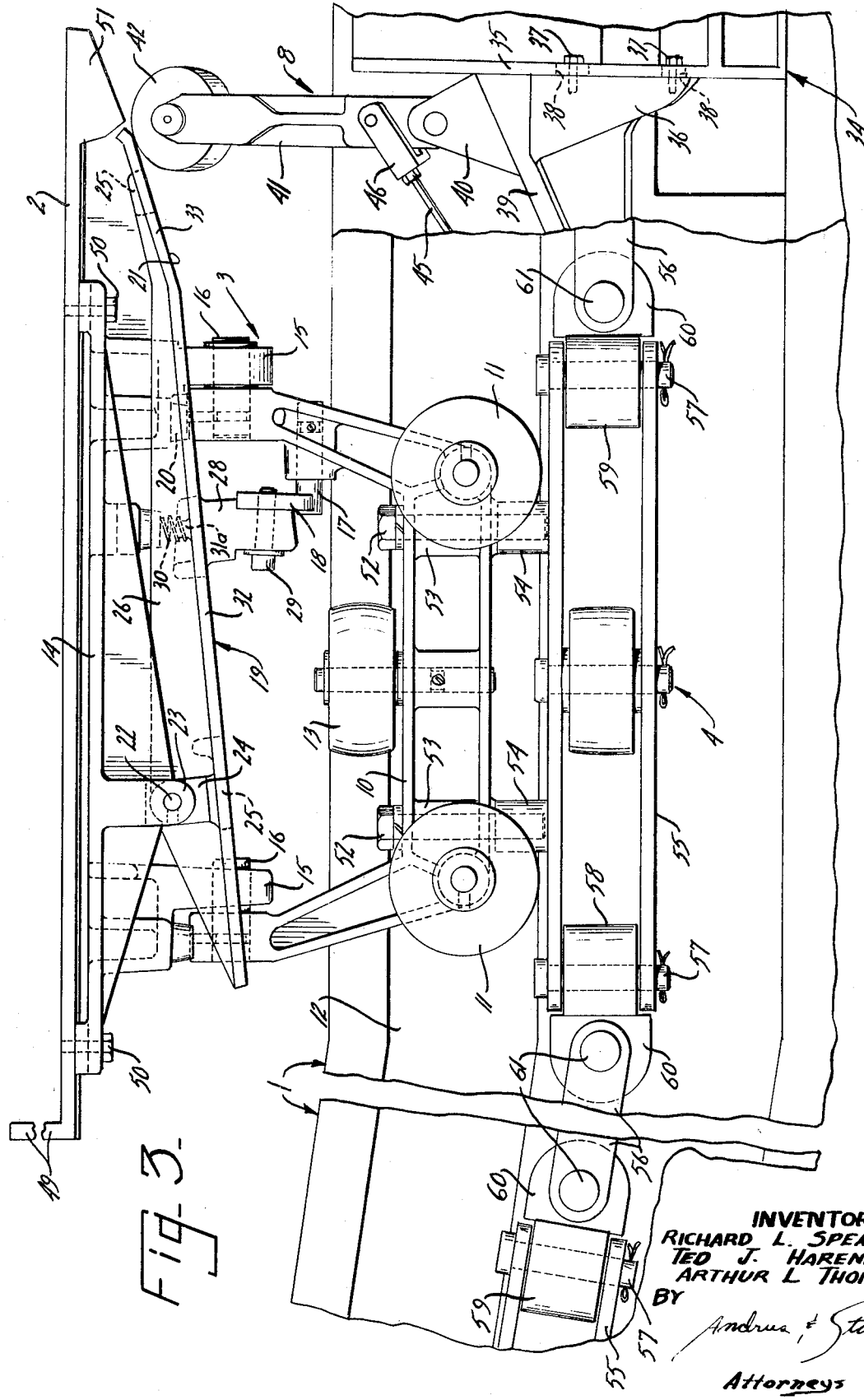

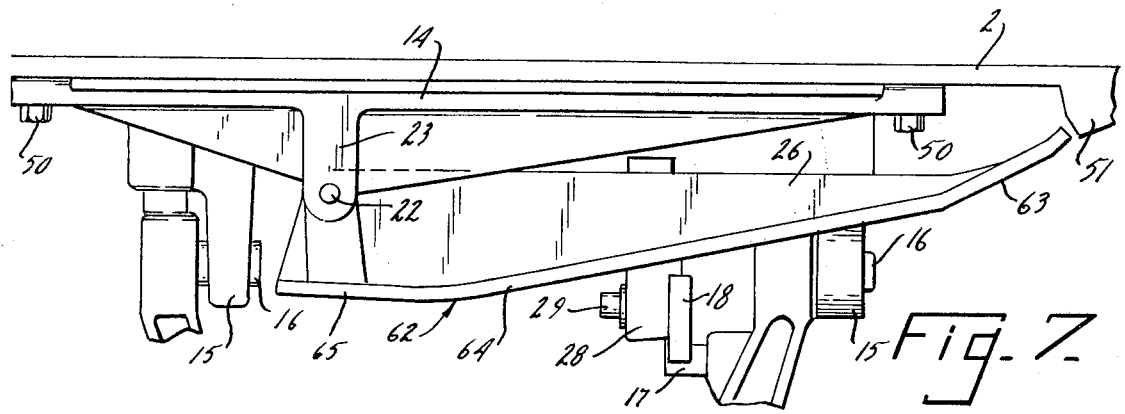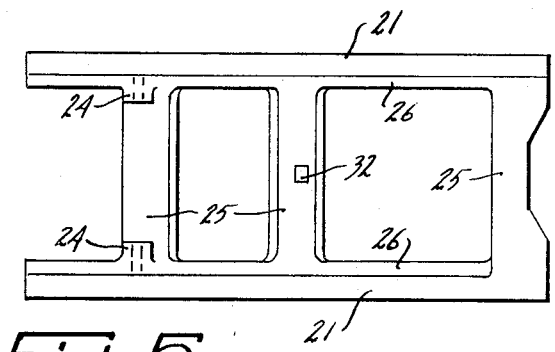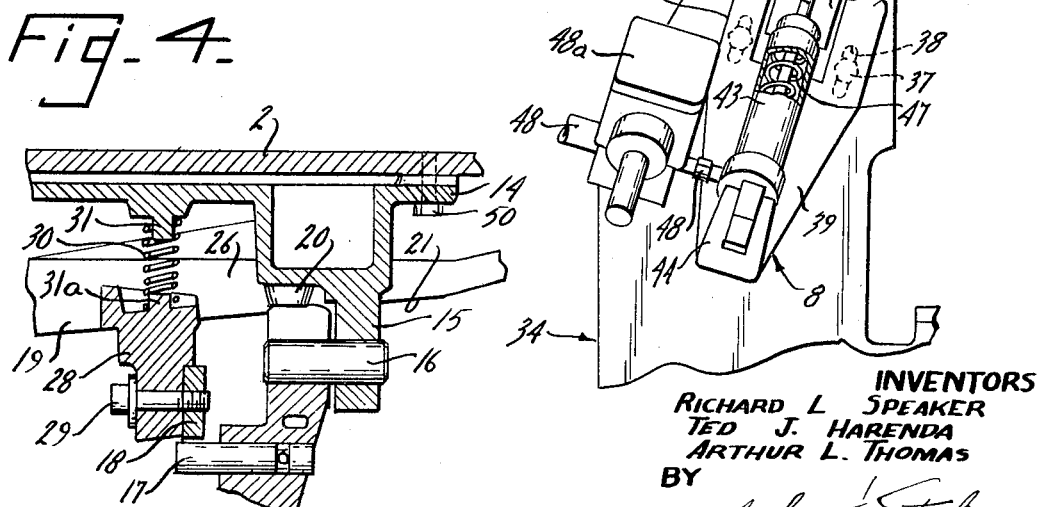

United States Patent Office 3,510,014
Patented May 5, 1970

3,510,014
CONVEYOR SYSTEM
Richard L. Speaker, Hartford, Ted J. Harenda, Muskego, and Arthur L. Thomas, Milwaukee, Wis., assignors, by mesne assignments, to "Automatic" Sprinkler Corporation of America, Cleveland, Ohio, a corporation of Ohio
Filed Oct. 2, 1967, Ser. No. 672,162
Int. Cl. B65g 47/38
U.S. Cl. 214—62                                  13 Claims

ABSTRACT OF THE DISCLOSURE

A conveyor includes a plurality of trays pivotally mounted to individual carriages and having a releasable latch mechanism which is actuated by a cam lever pivotally secured to the carriage. The cam lever is pivotally connected to the carriage with the pivotal connection located adjacent the trailing end of the tray. The cam lever includes two distinct inclined surfaces with a short incline at the leading edge at a steeper angle with respect to the plane of movement of the tray than the remaining portion of the cam member. A pneumatic or fluid actuated tilt arm is pivotally mounted at each of the unloading stations and positioned by a spring-loaded air cylinder. The first inclined portion releases the latch mechanism and the remaining incline portion tilts the tray. The leading edge of the tray is formed to define an extension of the leading inclined portion of the cam lever. A tilted tray can then engage an actuated tilt arm without damaging interference.

---

This invention relates to a conveyor system having a plurality of interconnected load carrying structures mounted for individual pivotal movement between a load carrying position and a load discharging position.

Automatic conveying and sorting devices have been developed for high speed sorting of products. U.S. Pat. No. 3,034,665 which issued to Richard L. Speaker on May 15, 1962, discloses a highly satisfactory conveyor system employing a plurality of load supporting trays or platforms interconnected for movement in an endless path for transporting of products from one or more loading stations to a plurality of preselected receiving or discharging stations. The platforms are individually and pivotally supported on interconnected carriage assemblies and normally locked in a horizontal transporting position. An interengaging releasable latch mechanism on the carriage and the platform includes a cam member which is engageable by a tipping member provided at the several receiving stations. The tipping members are selectively actuated when an appropriate platform is aligned therewith to engage the cam on the underside of the platform which causes the platform to tilt laterally of the direction of movement and to discharge the item to the proper receiving station. It has been found that this type of a tilt assembly results in a very practical and reliable conveyor system for distributing and sorting of products.

The present invention is directed to an improved construction of a laterally tilting tray conveyor and particularly such a tray-type conveyor wherein speeds of movement greater than presently possible are desired.

Applicant has found that as you increase the speed of the conveyor movement it is necessary to sequentially establish a rapid release of the latch mechanism and to then properly apply the tilt force to the tray structure for rapid and positive discharge of the articles.

The present invention has been found to permit exceptional rapid movement of the conveyor with reliable and positive tipping of the trays to the discharge position. Generally, in accordance with the present invention, a platform or tray is pivotally mounted to a carriage structure having a releasable latch mechanism which is actuated by a cam and lever arrangement, generally as in the previously referred to patent. The cam member of the present invention however is particularly formed with two distinct inclined planes or surfaces with the incline of the leading edge at a steeper angle with respect to the plane of movement of the tray than the remaining portion of the cam member. Further, the leading sharp incline portion is relatively short compared with the total length of the cam member and therefore the length of the second cam surface. It has been found that in operation the sharp incline portion provides a rapid release of the latch mechanism while the more shallow and longer incline portion provides a more effective and positive tilting force on the tray which insures the complete tilting of the tray. This system thereby minimizes the possibility of return movement of a tray to the horizontal position as a result of bounce loading or the like.

In accordance with a particularly novel aspect of the present invention, the cam member is pivotally connected to the carriage structure with the pivotal connection located adjacent the trailing end of the tray. The cam member extends forwardly and upwardly toward the leading end of the tray terminating inwardly of the leading edge of such tray. The placement of the pivot point of the double incline cam member is also found to have a very practical significance in the presence of high speed movement of the conveyor system.

Further, the leading edge of the tray is formed to define an extension of the leading inclined portion of the cam member. If a tray is moved to the tilt position through a malfunction or the like and approaches an actuated tilt mechanism the engagement of the cam surface on the leading edge returns the tray to the horizontal position without damage to either the tilt mechanism or the tray structure.

Further, in order to provide the desired positive movement and positioning of the tilting devices at the unloading station, the present invention in another aspect, provides a pneumatic or fluid actuated tilt member which is pivotally mounted at each of the unloading stations. Each member is positioned by an air cylinder or the like which is spring loaded to a standby position. It has been found that this provides a very rapid and positive positioning of the arm with a resulting improvement in the pivotal tipping or tilting of the tray structure.

In a tilting tray system, the level of the conveyor system may change within the system. It is therefore highly desirable to provide a simple means which will permit the movement of the trays in a vertical as well as in a horizontal direction. Applicant has found that the tray carriage may be interconnected through a drive chain having a double action pivot block joining the successive chain links which permits the relative pivotal movement of the chain links and therefore the carriage about either a horizontal axis for vertical movement or a vertical axis for turning movement in a horizontal plane.

In summary, the conveyor structure of the present invention may be operated at relatively high speeds while maintaining reliable and positive discharge of the items carried by the tray.

The drawings furnished herewith illustrate a preferred construction of the present invention in which the above advantages and features as well as others which are set forth in the following description of the drawings will be clear.

In the drawings:
FIG. 1 is a top plan view of a diagrammatic illustration of a conveyor incorporating the present invention;

FIG. 3 is an enlarged side elevational view of the tray assembly just prior to being tilted to the position of FIG. 2;

FIG. 4 is a fragmentary sectional view showing details of construction;

FIG. 5 is a paln view of the cam member shown in FIGS. 2–4;

FIG. 6 is a fragmentary view more clearly showing a tipping mechanism; and

FIG. 7 is a partial view similar to FIG. 3 showing an alternative embodiment of the structure.

Figure 1:
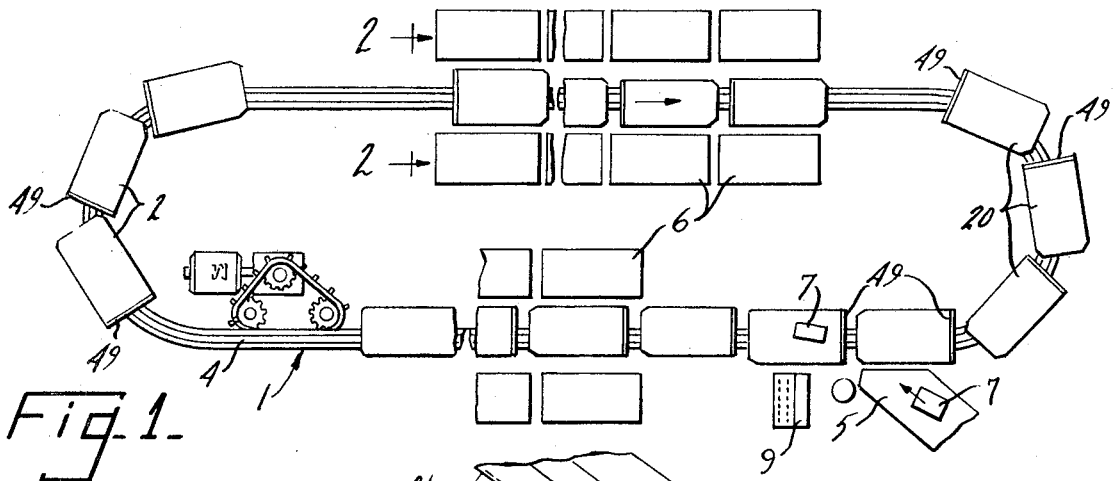

Referring to the drawings and particularly to FIG. 1, the present invention is shown applied to a loop conveyor system similar to that described in the previously referred to U.S. Pat. 3,034,665. Generally, the conveyor system includes a main track 1 formed in an endless loop. A plurality of similar trays 2, each defining a load supporting member, is pivotally mounted to individual carriages 3 which are movably supported on track 1. A drive chain 4 is mounted below the track 1 and interconnected to the several carriages 3 to transport and move the trays in endless sequence about the track 1 between a loading station 5 and a plurality of receiving containers or receptacles 6. A single input or loading station 5 is shown positioned adjacent one end of the loop in the illustrated embodiment of the invention wherein items or articles 7 are placed onto a particular tray 2. When that particular tray is aligned with a selected one of the receiving receptacles 6, a tip-up assembly 8 is actuated and the aligned tray 2 tipped laterally to discharge the article 7 to the appropriate receptacle.

A control panel 9 may be provided adjacent the loading station 5 for actuating a memory unit, not shown, which provides timed actuation of the tip-up assembly 8 in accordance with the time required for the appropriate tray 2 to move from the station 5 to the unloading station.

The present invention is particularly directed to the tray, carriage structure and tipping device and its interconnection with the drive chain 4. Consequently, such structure, its mounting and interconnection are presently described in more detail to clearly explain and describe the present inventive subject matter. The control, memory unit and the like may take any desired construction or design such for example as explained in the previously referred to patent and consequently no further description thereof is presently given herein.

Figure 2:
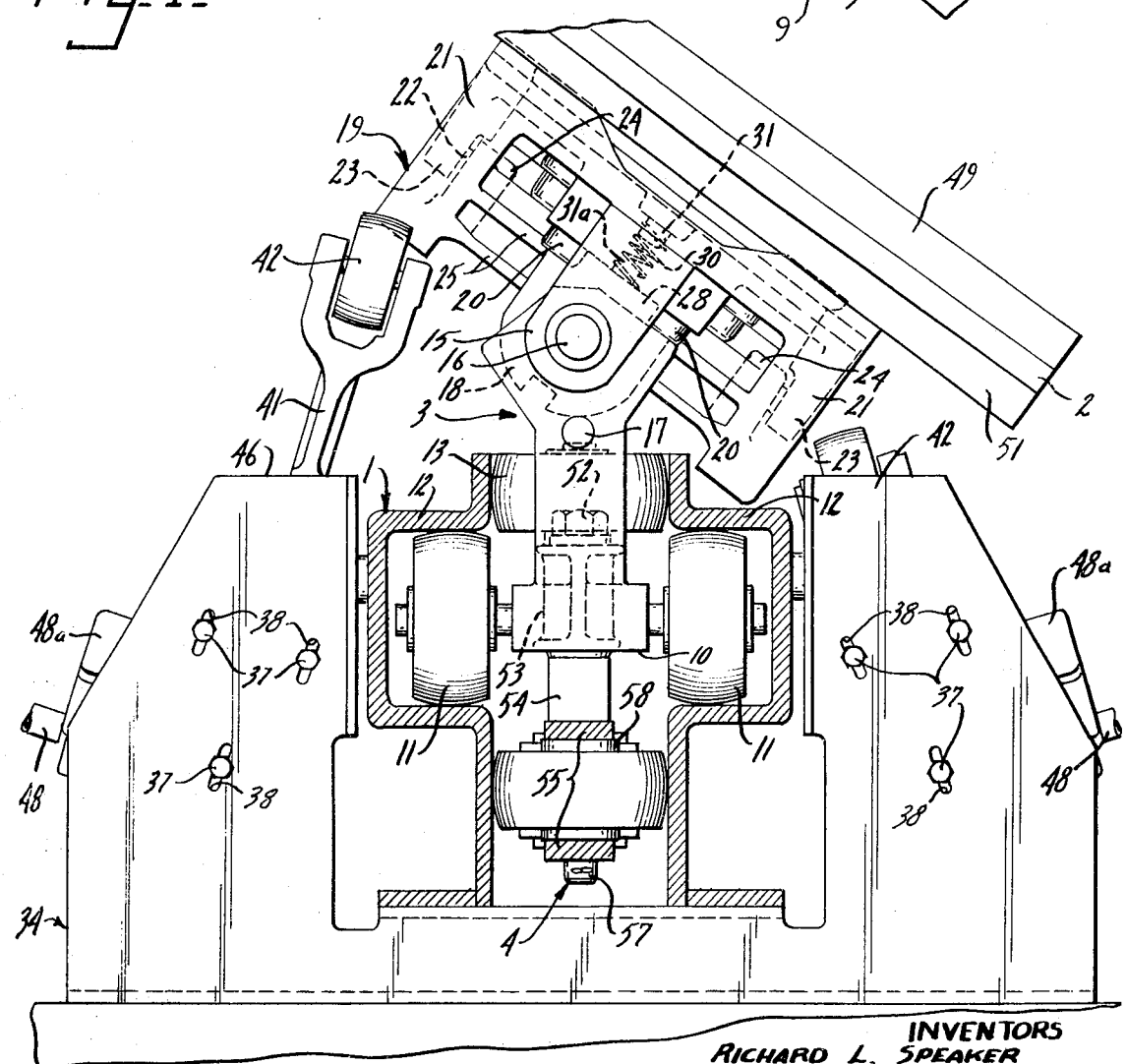
FIG. 2 is an enlarged front elevational view taken generally on line 2—2 of FIG. 1 with a tray in the tilted position.

Referring particularly to FIGS. 2–4, the carriages 3 for each of the trays 2 include a U-shaped body member or yoke 10 having a base portion parallel to the track 1 and having upstanding arms extending upwardly from the opposite ends of the base portion. Pairs of rubber or other similarly covered wheels 11 are secured to the opposite ends of the base portion and ride within laterally spaced U-shaped side rails 12 forming a part of the conveyor track 1. A guide wheel or roller 13 is rotatably mounted to the top central portion of the base of the yoke 10 and disposed in alignment with the upper side flanges of the side rails 12 to provide lateral guiding of the carriage 4 in the track 1.

A tray carrier 14 is pivotally mounted to the yoke 10. Carrier 14 includes an upper mounting frame and a pair of depending bearing arms 15 extending downwardly immediately adjacent the leading sides of the upper ends of the arms of yoke 10. Similar pivot shafts 16 are secured within the upper arms of the yoke 10 and are passed through the corresponding openings in the depending arms 15 to pivotally support the tray carrier 14. The tray carriers 14 are locked in the horizontal transporting position and pivoted laterally in either direction for discharging of a load as follows.

Referring particularly to FIG. 4, a locking pin 17 is secured to the leading arm of the yoke 10 and projects rearwardly therefrom immediately below the pivot shaft connection. An index plate 18 secured to carrier 14 includes a notch mating with the locking pin 17 to form a releasable latch mechanism normally holding the tray carrier 14 and the attached tray 2 in a horizontal transportation position. The index plate 18 forms a part of a tip-up lever assembly 19 which cooperates with the tip-up assembly 8 to disengage the index plate 18 from the pin 17 and then tilt the carrier and the tray.

As most clearly shown in FIG. 2, the upper ends of the yokes 10 are generally diamond-shaped solid members with the pivot pin 16 located centrally of the configuration. The upper slanted surfaces or edges of the yoke 10 define bumper or support flanges aligned with rubber bumpers 20 secured to the underside of the carrier. Thus, when the carrier 14 and tray 2 are tipped laterally it can move downwardly until the bumper 20 engages the flange of the yoke member.

The lever assembly 19 includes a cast open frame member, shown in FIG. 5, mounted immediately beneath the carrier with the similar interconnected side cams or levers 21 extending longitudinally of the carrier to the opposite sides of the pivot shafts 16. The trailing ends of the levers 21 are supported on a lever shaft 22 which is fixed beneath the tray carrier 14 in a pair of depending arms 23 formed on the underside and lateral edges of the carrier 14. The levers 21 include upstanding pivot lugs 24 adjacent to the trailing end thereof which lugs are pivotally mounted on the shaft 22. The levers 21 may be cast members and interconnected by a plurality of spaced cross braces 25. Strengthening ribs 26 are shown extending forwardly and rearwardly from the arms 23 along the top side of the carrier 4 to strengthen the structure.

Referring to FIGS. 3 and 4, the index plate 18 of the latching mechanism is secured to an index support arm 28 which is integrally cast or otherwise formed as a part of a cross brace 25 joining the levers 21 and depends from the brace 25. An attachment bolt 29 is shown extending through the lower end of the arm 28 and threading into the index plate 18 to securely lock the plate to the forward face of the arm 28 with the index notch of plate 18 mating with the pin 17 when the tray 2 is in a horizontal position. The index levers 21 and therefore plate 18 are biased to the latching position by a coil spring 30 acting between the carrier 14 and the lever assembly 19. A spring guide member 31 is secured to the underside of the carrier 14 and a spring guide member 31a is secured to the top side of the cross brace 25 in alignment with these index plate support arms 28 with the opposite end of spring 30 respectively secured thereto. When either of the levers 21 is raised upwardly, the latch plate 18 disengages the latch pin 17 and permits the pivotal movement of the tray carrier 14 and tray 2.

The index plate 18 to the opposite sides of the index notch is formed with a generally curved or rounded edge to permit rolling movement of the index plate on the pin and to support the latch lever assembly after movement of the tip-up assembly 8.

The levers 21 similarly include a relatively long tipping portion 32 extending forwardly from the trailing end past the leading pivot shaft 16. The forwardmost or leading end of the levers 21 is a sharper inclined unlatch or release portion 33 which is initially engaged by an assembly 8.

The location of the pivot support for the levers 21 adjacent the trailing end of the carriage and the forward location of the locking mechanism requires a minimal force to release the locking mechanism for subsequent tilting of the tray.

Each of the unloading positions may be provided with receptacles 6 to the oppostie sides of the track 1 with similar tip-up assemblies 8 disposed to the opposite sides. Referring to FIGS. 2, 3 and 6, the opposed tip-assemblies 8 in the illustrated embodiment of the invention are interconnected by a U-shaped mounting bracket or gusset 34 having the base portion extended beneath the track 1 and the side arms defining mounting walls 35 secured to the opposite sides of the track rails 12 beneath the carrier 14 and attached trays 2. A mounting bracket 36 is bolted to the mounting wall 35 of the gusset by mounting bolts 37 extending through slots 38 in the bracket. The slots 38 permit limited adjustment of the location of the tip-up assembly 8 for proper positioning thereof. The bracket 36 includes an outwardly disposed angled mounting wall 39 which is angularly related or disposed with respect to the lever assembly 19 to properly locate the tip-up assembly 8. Generally after the assembly 8 has been adjusted for proper actuation of the lever assemblies 19, the bracket 36 is field welded to positively and rigidly lock assembly 8 in position.

Laterally spaced pin hubs 40 are secured to the wall 39 immediately adjacent to the mounting wall 35. A tip-up arm 41 is pivotally mounted on a shaft secured within the hubs 40. The outer end of the arm 41 includes a tip-up roller 42 journaled therein.

A cylinder 43 is pivotally connected at the outer end of the mounting wall 39 as at 44 and extends forwardly with a piston rod 45 interconnected by a clevis 46 to the tip arm 41 immediately adjacent to its pivotal support. In the illustrated embodiment, the piston rod 45 is spring loaded by a spring 47 to the retracted position holding the arm 41 in a lowered position with roller 42 out of the path of the related cam levers 21 in both the transporting and tipped position of the trays 2. A fluid or air line 48 is connected to the cylinder 43 through a suitable control valve assembly 48a and connected to an air pressure source for selective application of air to the air cylinder. The application of air causes rapid extension of the piston rod 45 and raising of the roller 42 to the path of a lever 21, as shown in FIG. 6, where it is locked in place by the air supply. This has been found to provide a very reliable and positive positioning of the roller 42 for the tray structure during a tipping operation.

In operation, the actuation of control 9 establishes a recorded control signal for a particular tray 2 and receptacle 6. As that tray 2 approaches the proper receptacle 6, air is supplied to the cylinder 43 of the corresponding assembly 8 and the roller 42 is locked in the raised position. As the tray 2 moves past the assembly 8, the corresponding lever 21 engages the raised roller to tip the carrier 14 and attached tray 2. The initial engagement with the short, sharp inclined portion 33 rapidly releases the latch plate 18 and the trailing tip or tilt portion 32 provides a positive and reliable positioning of tray 2 for all loading of the tray and the desirable high speed movement of the trays 2.

It has also been found that the location of the pivot pin 22 adjacent to the trailing portion of the carrier 14 and the double inclined portions 32 and 33 of the cam levers 21 provides an unusually satisfactory high speed tip or tilt mechanism with positive and reliable movement of the tray to the discharge position.

The trays 2 are each similarly formed as slightly dished members of a suitable plastic or the like and provided with a stop wall 49 on the trailing edge. The forward corners are removed to permit movement about the corners of a loop.

The trays 2 are secured to the carriers 14 by a plurality of interconnecting attachment bolts or studs 50 depending from the underside thereof.

The forward or leading end of the tray 2 is formed with an enlarged cam ledge 51 on the underside which extends from the leadingmost edge rearwardly and downwardly generally in the plane of the unlatch cam surface or portion 33 of the index and tilt levers 21 which are joined at the leading end by a cross brace 25. This construction prevents damage to the assembly in the event a tray 2 is in a tilt position and through some malfunctioning or erroneous actuation of the system approaches an actuated tip-up assembly on the lower side of the tipped tray 2. The cam ledge 51 merely engages the roller 42 and pivots the tray upwardly and aligns the corresponding lever 21 with the roller such that the tray moves over to the discharge direction on the opposite side of the loop.

The carriages 3 are interconnected to the drive chain 4 for movement about the track or loop, as shown most clearly in FIGS. 2 and 3. Suitable attachment bolts 52 extend downwardly through longitudinally spaced hub members 53 in the base portion of the yoke 10 and thread into nut members 54 welded or otherwise secured to the top surface of a horizontally disposed mounting link 55 of the drive chain 4.

The drive chain 4 is a link type unit having alternate links 55 and 56 disposed in horizontal and vertical planes. The carriages 3 are secured to the links 55 disposed in the horizontal plane.

Each of the links 55 includes a top wall member and a vertically spaced bottom wall member interconnected by suitable link pins 57 secured to the opposite ends of the link wall members. A suitable guide roller 41 is secured centrally of each link 55 to guide the drive chain 4 between suitable guide members on track 1. Pivot blocks 58 and 59 are journaled on the pins 57 at the opposite end pins between the bottom and top link wall members. The pivot blocks 58 and 59 have a vertical axis of rotation. The adjacent vertical link 56 is secured to an extension 60 of the pivot blocks by a pin 61 having a horizontal axis of rotation, as viewed in FIG. 3.

The double action articulated chain structure of this invention permits turning in a horizontal plane and also turning movement in a vertical plane with the links pivoting about the respective pivot pins for the various movements. As a result the unloading stations can be disposed in the most convenient location with respect to the loading station.

In summary, the improved conveyor system of the present invention operates basically in a manner similar to that of the previously identified U.S. Pat. 3,034,665. The articles are loaded onto the horizontally disposed trays 2 and the control 9 actuated properly in accordance with the desired unloading station. The trays 2 move in a continuous train about the loop which might be in a single horizontal plane or may move from one horizontal plane to a raised or lowered plane depending upon the particular application as a result of the interconnected articulated chain 4. When the control panel 9 is actuated, a memory circuit, not shown, is established to store a signal and subsequently operate the control valve assembly 48 and apply an air signal to the appropriate tip-up assembly 8 as the tray 2 moves into alignment with that unloading receptacle 6. With the tip-up assembly 8 raised, the leading unlatch portion 33 of the cam lever 21 engages the roller 42 and rapidly rides thereon to unlatch the index plate 18 from the pin 17, thereby freeing the tray for pivotal movement.

The tray 2 and carriage 3 move rapidly through this relatively short latching portion into the lesser inclined positive tip portion 32 of the cam lever 21 which extends substantially for the length of the carrier and positively tilts the carrier 4 and the tray 2 to the discharge position. A tipped tray structure is held in the tilt position by gravity until it moves into engagement with a return mechanism, such as an intermediately positioned roller 42, at a selected portion of the loop.

In certain applications, the tipping portion 32 of the cam levers 21 may be desirably provided with a somewhat greater degree of incline. A second embodiment of the invention generally corresponding to that previously described is shown in FIG. 6. In the alternate embodiment only the construction of an index lever 62 which is interchangeable with the previously described index lever is changed and consequently only its structure is described in detail. Further, the corresponding elements in the embodiments of FIGS. 1–6 and FIG. 7 are similarly numbered for simplicity and clarity of explanation. The index lever 62 is similarly supported adjacent the trailing edge on the index shaft 22.

The unlatched portion or leading end of the levers 21 is formed with a similar relatively sharply inclined unlatch surface 63 integrally with an extension of a somewhat shallower tipping inclined surface 64. However, it will be noted that in the embodiment of the invention shown in FIG. 7, the portion or surface 64 is at a slightly greater angle than the corresponding portion of FIG. 3 and the trailing end of the lever terminates adjacent to the pivot pin 22 and somewhat further below the pin. Further, the trailingmost portion of the levers 21 is shown provided with a slight reversed inclined portion 65 to provide the desired release of the assembly from the tip-up assembly 8.

Generally, the embodiment of the invention shown in FIG. 7 will operate in the same manner as that previously described with the initial relatively sharp inclined portion providing for unlatching of the tray 2 and carrier 14 from the yoke 10 with the tipping portion 64 providing a positive tilting action on the tray structure to the discharge position.

It has been found that the present invention permits relatively large increases in the speed of the conveyor system over that which has heretofore been provided with tilting tray conveyors and provides both a reliable discharging of the products without damaging any of the mechanisms over long periods of time.

We claim:

1. A tipping means for a conveyor system for rapidly transferring of articles to an unloading station and including a cam member and an operating follower member engageable with the cam member for tipping a pivotally mounted carrier from a transport position to a discharge position as the carrier moves past an unloading station, said conveyor system having a load support means as a part of the pivotally mounted carrier for transporting a load to an unloading station, and a releasable latch including a first latch member on the load support means and a second latch member on the carrier, one of said latch members being movable and coupled to the cam member, the improvement in the cam member comprising said cam member having a tipping portion with a predetermined degree of incline along its length with respect to said follower member and a substantially shorter unlatch portion having a substantially greater degree of incline along its length with respect to the follower member to produce a rapid release of the latch and subsequent positive tipping of the carrier.

2. The tipping means of claim 1 having said cam member pivotally mounted to the carrier with the pivot mounting adjacent the trailing portion of the cam member and carrier, and with said cam member extending forwardly and terminating adjacent the leading portion of the tray.

3. The tipping means for the load support means of claim 1 having a tray structure extending slightly forwardly of the cam, the leading under edge being formed with a cam portion which is essentially coplanar with said unlatch portion.

4. The tipping means for the load support means of claim 1 wherein said cam member includes a similar cam surfaces to the opposite sides of the carrier for tilting of the carrier in either direction.

5. The tipping means of claim 1 wherein said tipping means has the cam member secured to the carrier and the operating follower member is secured at an unloading station, a pneumatic cylinder and piston assembly connected to position said operating arm and pneumatically hold the arm in the tipping position.

6. The tipping means of claim 1 wherein said tipping means includes means to secure the cam member to the trailing end of the carrier and the operating arm secured at an unloading station, a spring-loaded pneumatic cylinder and piston assembly having a piston rod connected to said operating follower member, said assembly having spring means urging said piston rod to a retracted position to hold the arm in spaced relation to the cam member, and a pneumatic source connection means to apply a pneumatic pressure to the cylinder to extend said piston rod and pneumatically hold the arm in the tipping position.

7. The tipping means of claim 1 having a carriage having a leading support arm an a trailing support arm, pivot means securing the carrier to said carriage support arms, a pivot means connecting the cam member to the trailing portion of said carrier and extending forwardly therefrom, at latch plate secured to an intermediate portion of the cam member immediately rearwardly of the leading support arm, the lower edge of the plate being rounded and having a central locking means selectively engageable with a locking means secured to the leading support arm for selective engagement therebetween to hold the support means in a horizontal transport position.

8. The tipping means of claim 1 having a carriage with a pair of upstanding support arms spaced in the direction of travel, pivot means securing the carrier to said arms, a pivot means connecting the trailing portion of the cam member to said carrier immediately forwardly of the trailing support arm, said tipping portion of said cam member terminating forwardly of the leading support arm, a latch plate secured to an intermediate portion of the cam member immediately rearwardly of the leading support arm, the lower edge of the plate being rounded and having a central locking notch, a locking pin secured to the leading support arm for selective engagement with said notch to hold the support means in a horizontal transport position, a tray secured to said carrier and extending forwardly of said cam member and including a cam surface on the underside of the leading end and forming an extension of said unlatch portion of said cam member.

9. The tipping means of claim 1 having the cam member pivotally mounted to the carrier with the pivot mounting adjacent the trailing portion of the cam member and carrier, said cam member including similar cam levers disposed to the opposite sides of the pivotal mounting of the carrier and cross members interconnecting said cam levers, said cam levers extending forwardly and terminating adjacent the leading portion of the tray with one of said cross members joining the leading ends of said cam levers.

10. A conveyor system having a load support tray pivotally mounted on a carriage for lateral pivotal movement and means to move the carriage between a loading station and unloading stations, said system employing a releasable tipping means including a cam member secured to the carriage and a follower member secured at each unloading station, and a releasable latch including a first latch member on the load support tray and a second latch member on the carriage, one of said latch members being movable and coupled to the cam member, said cam member having a tipping portion with a predetermined degree of incline with respect to said follower member and a substantially shorter unlatch portion having a substantially greater degree of incline with respect to the follower member.

11. The conveyor system of claim 10 having said carriage including a generally U-shaped member with a pair of upstanding support arms spaced in the direction of travel, pivot means secured to the tray and the upper end of said arms, a second pivot means connected to the trailing portion of the cam member and to said tray adjacent the trailing support arm, said tipping portion of said cam member terminating forwardly of the leading support arm and inwardly of the leading end of the tray, said tray including a cam surface on the underside of the leading end and forming an extension of said unlatch portion of said cam member.

12. The conveyor system of claim 11 having a latch plate secured to an intermediate portion of the cam member immediately rearwardly of the leading support arm, the lower edge of the plate being rounded and having a central locking means selectively engaging a second locking means secured to the leading support arm to hold the tray in a horizontal transport position.

13. A conveyor system having a load support tray pivotally mounted on a carriage for lateral pivotal movement and means to move the carriage between a loading station and unloading stations, said system employing a releasable tipping means including a cam member secured to the carriage and a follower member secured at each unloading station, and a releasable latch including a first latch member on the load support tray and a second latch member on the carriage, one of said latch members being movable and coupled to the cam member, said cam member having a tipping portion with a predetermined degree of incline with respect to said follower member, said cam member terminating in spaced relation to the leading edge of the tray, and said tray including a cam portion on the leading edge defining an extension of said cam member.

References Cited

UNITED STATES PATENTS

| | | | |
|---|---|---|---|
| 2,431,174 | 11/1947 | Henry | 214—62 |
| 3,034,665 | 5/1962 | Speaker. | |
| 3,269,520 | 8/1966 | Bishop et al. | 198—155 |

ROBERT G. SHERIDAN, Primary Examiner

U.S. Cl. X.R.

198—155

UNITED STATES PATENT OFFICE
CERTIFICATE OF CORRECTION

Patent No. 3,510,014                    Dated May 5, 1970

Inventor(s) Richard L. Speaker et al

It is certified that error appears in the above-identified patent and that said Letters Patent are hereby corrected as shown below:

Column 2, line 40, cancel "tiltng" and substitute therefor ---tilting---

Column 3, line 9, cancel "paln" and substitute therefor ---plan---

Column 7, line 62, after "includes" and before "similar" cancel "a"

Column 8, line 10, cancel "an" and substitute therefor ---and---

Column 8, line 14, cancel "at" and substitute therefor ---a---

SIGNED AND
SEALED
SEP 15 1970

(SEAL)
Attest:

Edward M. Fletcher, Jr.
Attesting Officer

WILLIAM E. SCHUYLER, JR.
Commissioner of Patents